Figure 1:
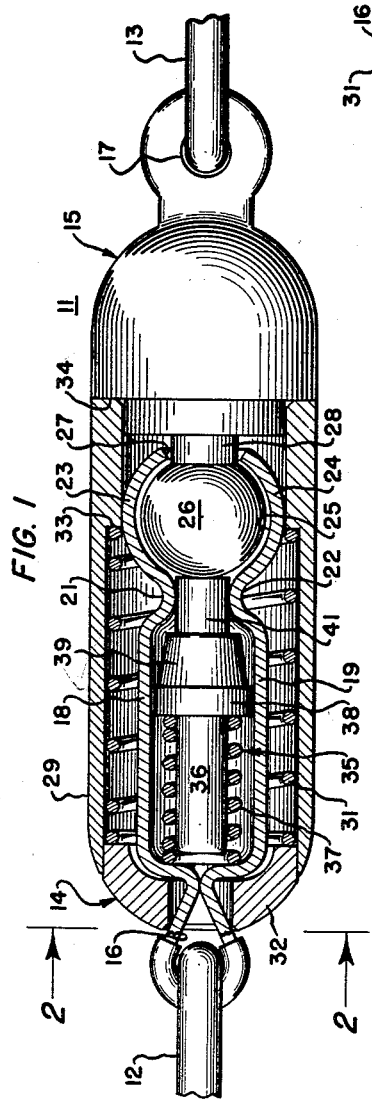

March 2, 1965     J. R. JOHNSTON     3,171,183
UTILITY FASTENER

Filed June 20, 1961     3 Sheets-Sheet 1

INVENTOR.
JAMES R. JOHNSTON
ATTORNEYS

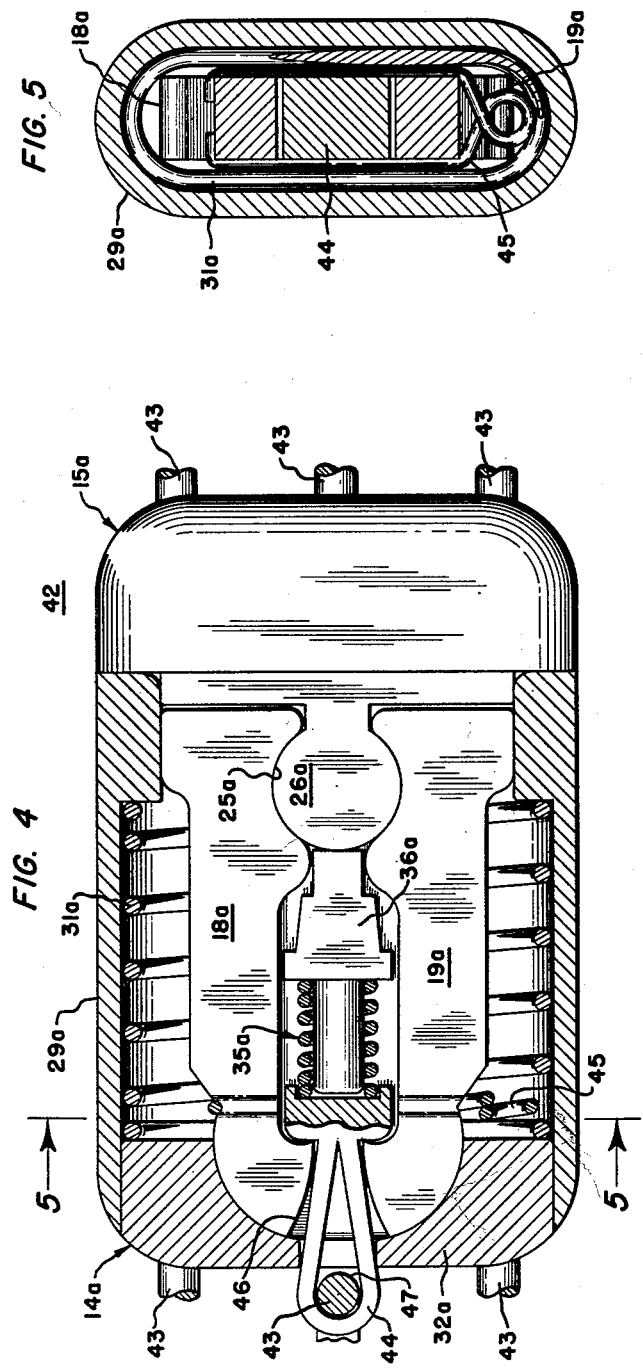

March 2, 1965  J. R. JOHNSTON  3,171,183
UTILITY FASTENER
Filed June 20, 1961  3 Sheets-Sheet 3
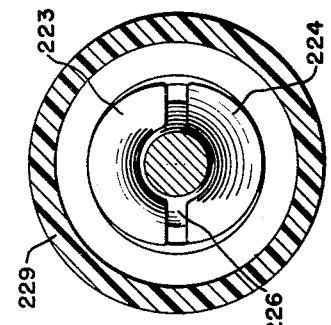
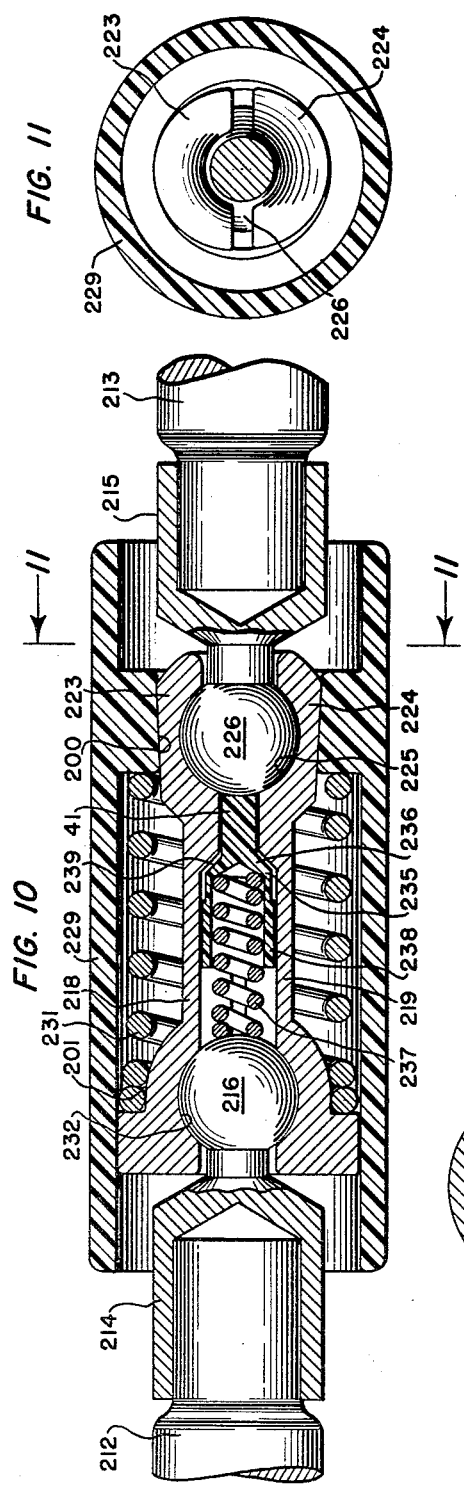
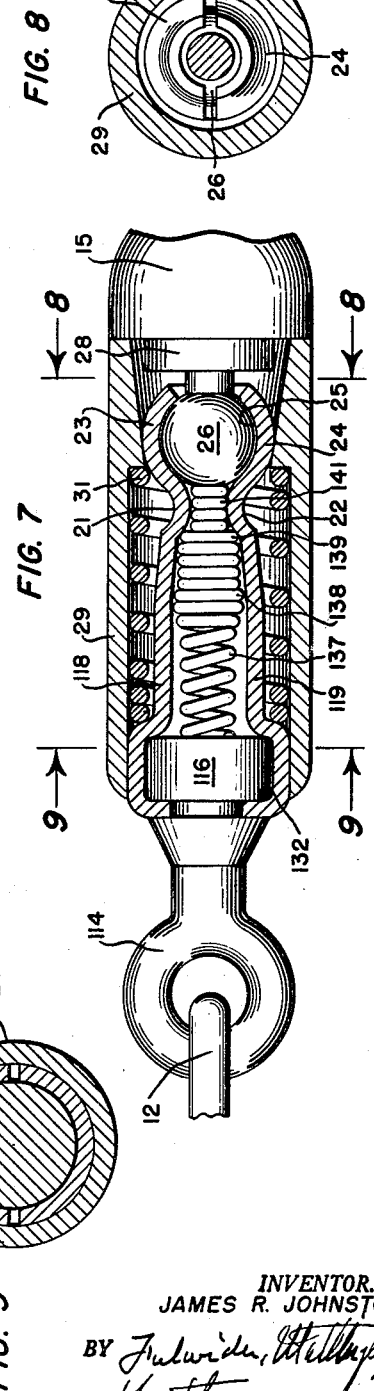
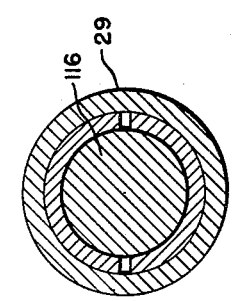
INVENTOR.
JAMES R. JOHNSTON
BY
ATTORNEYS United States Patent Office 3,171,183
Patented Mar. 2, 1965

3,171,183
UTILITY FASTENER
James R. Johnston, 4021 La Salle St., San Diego 10, Calif.
Filed June 20, 1961, Ser. No. 129,880
16 Claims. (Cl. 24—230)

The present invention is a continuation-in-part of my co-pending applications, Serial No. 607,605, filed July 8, 1957, now abandoned and Serial No. 768,722, filed October 21, 1958, now Patent No. 3,081,508.

The present invention relates to a connector, and more particularly to a connector which provides a secure but readily disconnectable linkage between elements.

This invention is adapted to a variety of applications such as, for example, securing keys to a keychain, holding together the ends of a choker or necklace, serving as a quick-disconnect device for the leaders and hooks of a fisherman's line, or providing a strong but easily separable fastener for cables, electrical terminals, chains, tie-down ropes and guy wires. In short, the invention is useful in most situations where there is required to be a strong connection which is easily releasable.

Accordingly, the present invention comprises a pair of end members or electrical terminals which are adapted for securement to the elements to be releasably connected together. One of the elements, to be connected, is held in place by an expandable socket, and this socket is normally maintained in latching position by a sleeve which surrounds the same. A spring normally holds the sleeve in socket-element latching or locking position.

In the preferred embodiment, a bias member is provided which tends to effect a disengagement of the normally engaged end members. However, the bias member is opposed by the action of a retainer means which is arranged to cooperate with the end members to normally maintain them in mating or engaged relationship. The retainer means is actuable, as desired, to move out of this position to permit disengaging movement of the end members, whereupon the bias member effects such disengaging movement. Thus, the present connector is actuable at will to effect disengagement, and, as will be described more completely hereinafter, the nature of the engagement between the end members also provides a very strong linkage between the elements to be connected. In addition, it is important to note that after the end members of the present device have become disengaged, the bias member serves to hold the various components of the connector in position for re-engagement. Moreover, the bias member continues to maintain the components in this latter position until the end members approach a position of re-engagement, whereupon the bias member is caused to move under the action of the engaging members, and thereafter the retaining means maintains the engaged relationship between the end members.

The present connector is light in weight, strong, easily actuable, and economical to manufacture and maintain. Moreover, the connector is relatively simple in operation, and generally superior for a variety of applications.

Figure 2:
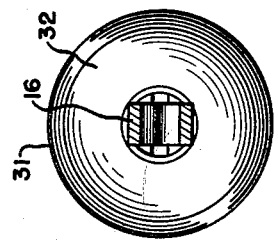
Figure 3:
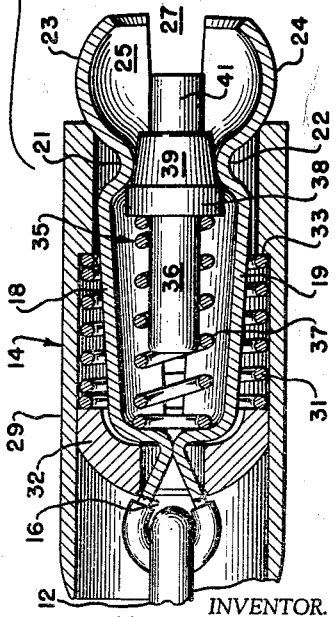

In addition to the above, various other objects and features of the present invention will be readily apparent to one skilled in the art from the following specification and appended drawings wherein are illustrated preferred forms of the invention, and in which:

FIG. 1 is a longitudinal sectional view of the connector of the present invention;
FIG. 2 is a view taken along line 2—2 of FIG. 1;
FIG. 3 is a view similar to FIG. 1, but showing the connector in a position of disengagement;
FIG. 4 is a longitudinal sectional view of another embodiment of the present invention;
FIG. 5 is a view taken along line 5—5 of FIG. 4; and
FIG. 6 is a longitudinal sectional view of still another embodiment of the present invention;
FIG. 7 is a view similar to FIG. 1, but showing another embodiment of the invention;
FIGS. 8 and 9 are sectional views taken along lines 8—8 and 9—9, respectively of FIG. 7;
FIG. 10 is a view similar to FIG. 1, but showing the connector for connecting electric terminals; and
FIG. 11 is a sectional view taken along line 11—11 of FIG. 10.

Referring to the drawings and more particularly to FIGS. 1 through 3, there is illustrated an embodiment of the fastener or connector of the present invention which is generally designated 11, and which will be described with reference to a necklace having end elements 12 and 13 to be connected together. It is to be understood, however, that the reference to a necklace is merely by way of example and not by way of limitation, and that the connector of the present invention may be constructed as an integral part of the necklace and thereby itself form the end elements of the necklace.

Connector 11 is preferably formed as an elongated cylinder, rounded at the ends, and comprises, generally, a pair of end sections or members 14 and 15 which are provided with eyes or openings 16 and 17 for the accommodation of the opposite ends, respectively, of the necklace chains, cords, or elements 12 and 13. It will be apparent that, by reason of the securement of elements 12 and 13 to end members 14 and 15, the elements 12 and 13 will be separably secured together when members 14 and 15 are in engaged position.

End member 14 is formed to define a plurality, preferably a pair, of holder, cage, or receptacle sections 18 and 19 which are integral or joined at their left ends in a manner providing the loop forming the eye 16 for necklace element 12. Assuming there are a pair of sections 18 and 19, they will be substantially half cylinders which complement each other and are provided with reduced diameter or neck portions 21 and 22. These portions 21 and 22 broaden out to the right to produce semi-spherical receptacles, jaws or socket elements 23 and 24 which define therebetween a socket 25. Since end member 14 is formed into two half cylinders, that is, sections 18 and 19, member 14 is adapted to be spread apart or opened to receive and accommodate a protruding member or ball 26 of end member 15, ball 26 being of such a diameter that it fits snugly within and between socket elements 23 and 24 when elements 23 and 24 are in closed position, as best seen in FIG. 1. It will be noted, from reference to FIG. 3, that in the open position of elements 23 and 24 ball 26 will easily pass into socket 25 through the aperture 27 formed between the separated or opened elements 23 and 24. However, when socket elements 23 and 24 are brought together their right end portions will fit within a reduced diameter portion 28 which integrally joins ball 26 to member 15. Thus, assuming for the moment that socket elements 23 and 24 are restrained against movement outwardly to their open position, it will be apparent that necklace elements 12 and 13 cannot be separated by reason of the secure engagement of ball 26 within socket 25, that is, as viewed in FIG. 1, the inner side of the right ends of the socket elements provide shoulders and are in complement, and consequently in interlocking relationship with the shoulders provided by the right side of the ball 26.

The means for normally retaining socket elements 23 and 24 in their closed position to thereby maintain the engagement between members 14 and 15 preferably includes a cylindrical sleeve 29 which is disposed about receptacle sections 18 and 19 and is adapted for slidable movement thereover. Such slidable movement to the left is limited by a bias means such as a coil spring 31 which is circumferentially disposed within and adjacent to sleeve 29. At one end spring 31 bears against a collar 32 which forms a part of and is axially immovably carried at the left end of member 14, as illustrated. At the other end, spring 31 bears against an inner annular shoulder 33 of sleeve 29 whereby sleeve 29 is biased to the right. The bias of sleeve 29 is sufficiently great that it is adapted to act against the outspread or opened socket sections 23 and 24 to urge them inwardly into their closed position. Of course, sleeve 29 is ineffectual to so move sections 23 and 24 in the presence of an obstruction or greater force acting to maintain the sections 23 and 24 in their open position, as will be seen, and the opened sections 23 and 24 would thus limit movement to the right of sleeve 29. When sections 23 and 24 are in closed position, movement of sleeve 29 to the right is limited by abutment of the end of sleeve 29 with an annular and mating shoulder 34 of end assembly 15.

There has been described the structure and means for effecting and maintaining engaged relationship between assemblies 14 and 15, and it will be apparent that disengagement will be effected if sleeve 29 is grasped and urged to the left, and additionally, some means is provided to urge socket sections 23 and 24 outwardly to permit ball 26 to be withdrawn. Such a means is provided by a control or bias means 35 which is carried within the hollow interior formed within receptacle sections 18 and 19.

Control means 35 includes a plunger or control element 36 which is biased to the right by a spring 37 acting at one end against the left end wall of the interior of sections 18 and 19, and acting at the other end against a stop shoulder 38 formed upon element 36. Movement of element 36 to the right is limited by shoulder 38 since shoulder 38 is greater in diameter than the diameter of the opening formed by neck portions 21 and 22, even when portions 21 and 22 are fully open. Referring to FIG. 3, it will be seen that the size of opening defined by portions 21 and 22 is in turn limited by the internal diameter of the adjacent portion of sleeve 29.

Control means 35 also includes a right end portion 41 to the right of tapered portion 39. It is noted that portion 39 is tapered inwardly to the right and is preferably smaller in diameter than portion 38 throughout its tapered section. It is also noted that portion 41 is lesser in diameter than portion 39, whereby portion 39 of element 36 is adapted to be urged by bias means 37 through neck portions 21 and 22 and adjacent to ball 26.

When ball 26 is disengaged from socket 25 to open connector 11, the smallest diameter of portion 39 is small enough to permit it to be biased to a position between neck portions 21 and 22, at which time end portion 41 projects into socket 25, FIG. 3. The tapered construction of portion 39 eases its entry between neck portions 21 and 22, as will be apparent, although, if desired, portion 39 could be made of uniform diameter. When in position between neck portions 21 and 22 portion 39 prevents closure movement of socket elements 23 and 24, maintaining them in open position ready to receive ball 26. Then, when ball 26 is brought into socket 25, ball 26 urges element 36 to the left against the bias of spring 37, and the bias of spring 31 next urges sleeve 29 to the right to thereby urge socket elements 23 and 24 to closed position.

When it is desired to open connector 11, sleeve 29 and member 15 are grasped and pulled apart until sleeve 29 is out of interfering relation with elements 23 and 24. These elements 23 and 24 are cammed laterally by the tapered portion 39 under the influence of spring 37, that is, they are then open to permit withdrawal of ball 26. It is thus important to note the important function of control means 35 in causing elements 23 and 24 to spread apart laterally and in maintaining elements 23 and 24 in this position until reinsertion of ball 26 into socket 25.

Another embodiment of the invention, generally designated 42, is illustrated in FIGS. 4 and 5, and comprises essentially the same parts operating in essentially the same way as set forth with respect to connector 11. Because of such similarity, the construction of connector 42 will not be described in any great detail, the description being confined to points of difference over connector 11.

Connector 42 is elongated in shape, similar to connector 11, but unlike the preferred rounded, cylindrical shape of connector 11, connector 42 is of lesser thickness so as to lie flat and, if desired, be connected at its ends to a greater number of necklace strands or the like, as at points 43 for example. By reason of its rectangular configuration in transverse cross section, certain of the components of connector 42 are also substantially rectangular in shape, as is best illustrated in FIG. 5, such as element 26a for example. Connector 42 comprises, generally, a pair of end members 14a and 15a adapted for securement to necklace elements or strands at points 43, although, of course, it is contemplated that numbers 14a and 15a may, of desired, be formed as the necklace end elements themselves.

Member 14a includes a pair of separate receptacle sections 18a and 19a which are shaped at their end portions to provide a common enclosure for a control means 35a, and shaped at their right end portions to define a socket 25a for accommodating a protruding element or disk 26a of member 15a, as will be seen. It will be apparent that element 26a is securely retained in position in socket 25a by sections 18a and 19a when such sections are clamped together in their closed position, whereby members 14a and 15a are held together in engaged position.

A rectangular sleeve 29a, biased to the right by a spring 31a, serves to maintain engagement between assembiles 14a and 15a, by preventing outward pivotal movement of sections 18a and 19a, just as was previously described in connection with connector 11. Further, as in the case of connector 11, control means 35a serves to urge a control element 36a against sections 18a and 19a to tend to move them outwardly to open position when sleeve 29a is grasped and moved out of interfering relation with sections 18a and 19a. As illustrated in FIGS. 4 and 5 and as will be apparent from a comparison with similar components of connector 11, the shape and size of the components of connector 42 and made to effect the same locking into open position of sections 18a and 19a by control element 36a after element 26a is withdrawn or disengaged. Further, this locking is maintained until element 26a re-enters socket 25a and contacts element 36a and moves it to the left.

The left ends of sections 18a and 19a are slidably and pivotally disposed against a collar 32a, which forms a part of end member 14a. Moreover, sections 18a and 19a are spaced apart and collar 32a is centrally bored to permit a loop element 44 to be disposed therethrough and carried within the space formed between sections 18a and 19a at their mid-portions. Element 44 is made large enough at its right end that it cannot be pulled to the left, being retained in position by sections 18a and 19a which, in turn, are maintained in axial position by collar 32a and held together, particularly during assembly of connector 42, by a peripheral spring 45. Loop element 44 is grooved (not shown) to also accommodate spring 45, whereby element 44 is also maintained in position during assembly of connector 42. It is noted further that the inner ends of sections 18a and 19a are shaped at 46 in a manner which facilitates pivotal movement of sections 18a and 19a to their open position, this shape also serving to a certain extent to permit a desirable flexibility and freedom of movement between assemblies 14 and 15 whereby the associated necklace will be characterized by a flexibility at the connected ends.

If it is desired to increase the strength of the loop element of assembly 14, or the loop element 44 of assembly 14a, as the case may be, a wear link 47 may be provided if desired, as illustrated in FIG. 1.

Still another embodiment of the present invention is illustrated in FIG. 6. This embodiment, which is generally designated 48, is particularly adapted to be housed within, and form a continuation of, a decorative outer sleeve. For convenience only end portions 49 and 51 of this outer sleeve are illustrated in FIG. 6, and it is to be understood that the sleeve, and those exteriorly visible portions of connector 48, are preferably made so as to appear to be a continuous decorative outer sheath of a necklace, bracelet, or the like.

Within the decorative sleeve are located the wire strands which primarily serve to secure together the necklace, the end elements of such strands being indicated at 12b and 13b. These elements 12b and 13b are the structural elements which are connected together by connector 48, but for esthetic reasons are concealed by the decorative sleeve of which end portions 49 and 51 form a part.

Connector 48 is substantially the same as connector 11, it being noted that a protuberant member 52 is provided which has a plurality of annular toothed portions 53 disposed about its exterior for threaded engagement with necklace portion 51 to thereby hold portion 51 in position. In addition, a peripheral flange 54 of member 52 abuts against the end of necklace portion 51, and serves to establish the longitudinal position of member 52 with respect to element 51. Another distinction of connector 48 over connector 11 which should be noted is the provision of a sleeve 29b which performs the same function as that of sleeve 29 of connector 11, but which is formed of a material and configuration matching that of end elements 49 and 51. The bias means for sleeve 29b, that is, a spring 31b, is also made to match elements 49 and 51 and preferably forms a natural extension of element 49. Of course, spring 31b may be made as a part of element 49, if desired, it being necessary only, for example, to make the helical coils 49 of a spring-like material. In operation, connector 48 is placed in disengaged position by grasping the sleeve 29b and moving it to the left against the bias of spring 31b, thereby permitting the socket elements 23b and 24b to spring apart, as will be apparent. In their spread apart position, elements 23b and 24b then serve to hold sleeve 29b to the left in its retracted position.

Referring now to the embodiment shown in FIGS. 7, 8 and 9, it will be seen that the receptacle sections or half cylinders 118 and 119 are similar to the sections 18 and 19 of the embodiment shown in FIGS. 1 to 3. However, in this embodiment, shown in FIGS. 7, 8 and 9, the sections 118 and 119 are bulged outwardly toward the left end thereof to provide a socket 132 for receiving the head 116 of the end section 114. This end section 114 is provided with an opening for receiving the chain element 12. These receptacle sections or half cylinders 118 and 119 are preferably formed of a stamping.

In this embodiment shown in FIGS. 7, 8 and 9, there is employed a spring as the plunger or control element 36, the shoulder 38, the tapered portion 39 and the end portion 41, employed in FIGS. 1 to 3. This spring element is formed of flexible and resilient material such as spring steel and is in the form of a coil having a spring portion 137, a guiding portion 138, a tapered portion 139 and an end portion 141. This spring is under compression, one end bearing against the right end of head 116 and the other end against the protruding member or ball 26 when the ball is in lock position. When the connector is in non-lock position, the tapered portion will bear against the left side of the neck portions 21 and 22, as is shown in FIG. 3.

Like the embodiment shown in FIGS. 1 to 3, when the sleeve 29 is moved to the left, so that the semi-spherical portions are released for radial or transverse movement, such transverse movement will be imparted to the semi-spherical sections by reason of the tapered portion 139 bearing against the left sides of the neck portions 21 and 22.

Referring now to the embodiment shown in FIGS. 10 and 11, in this embodiment, the connector functions as an electrical connector. The receptacle sections or half cylinders 218 and 219 are bulged outwardly spherically to form a socket 232 for receiving the spherical end section 216 of an electric terminal 214. A wire 212 is attached to terminal 214. The control means 235 comprises a plunger or control element 236 having a socket portion 238 which is open at the left end thereof for receiving the compression spring 237. This compression spring is interposed between the right end of the spherical end section 216 of the terminal 214 and the right end of the socket 238. This control element 236 includes a conically tapered portion 239 and an end portion 41. This control element 236 is formed of insulating material, preferably a plastic. In this embodiment the semi-spherical sections 223 and 224 form a spherical socket 225 for receiving the spherical end 226 of an electrical terminal 215 which is connected with a wire 213. The control element 236 in this embodiment functions in the same manner as was described with respect to the control element 36 in FIGS. 1, 2 and 3.

It will be observed that in this embodiment the semi-spherical sections 223 and 224 are tapered outwardly to the right and a complementing taper 200 is formed on the sleeve 229. The purpose of these tapers is to provide for camming these semi-spherical sections 223 and 224 inwardly into immediate contact with the terminal ball 226 so as to provide good contact at the junction of the ball 226 and the sections 223 and 224. The sleeve is also formed of insulating material, preferably a plastic. Spring 229 is of sufficient strength and resiliency so as to effectively press sections 223 and 224 against the ball 226 and in bearing against the spherical camming surfaces or shoulders 201 on the outer, right surfaces of the bulged portions 203 of the semi-cylindrical sections 218 and 219, it presses said bulged portions tightly against the ball section 216.

It will be observed that the peripheries of the left ends of the elements 118 and 119 form a guide for the sleeve 29, and likewise the peripheries of the left ends of elements 218 and 219 form a guide for the sleeve 229.

Thus, a unique connector has been afforded which provides a secure but readily disconnectable linkage between elements, and which maintains the components thereof in position for reconnection without further adjustment or operation.

While certain preferred embodiments of the invention have been specifically disclosed, it is understood that the invention is not limited thereto as many variations will be readily apparent to those skilled in the art, and the invention is to be given its broadest possible interpretation within the terms of the following claims.

I claim:

1. A connector for securing together a plurality of elements, said connector comprising a pair of end members normally engageable to secure together at least a pair of said plurality of elements, one of said end members including a plurality of movable jaws spaced apart to define a hollow interior, means located within said hollow interior and engageable with the walls defining said hollow interior of said jaws for moving and maintaining said jaws in an outward position away from each other whereby said jaws are adapted to receive therewithin the other of said end members, retaining means disposed about and completely overlying the exterior of said jaws to normally restrain said jaws against movement to said outward position, said retaining means being movable to a position away from said jaws to permit said jaws to be biased to said outward position and bias means located within said retaining means and operative against said retaining means to move said retaining means to a position completely overlying said jaws.

2. A connector for securing together a plurality of elements, said connector comprising a pair of end members normally engageable to secure togeter at least a pair of said plurality of elements, one of said members including a plurality of movable jaws spaced apart to define a hollow interior, said jaws including walls which form a reduced diameter neck portion and a socket portion, a movable control element having a mid portion and an end portion, bias means located within said hollow interior and operative against said control element to move said mid portion against said neck portion to move said jaws outwardly and to bring said end portion within said socket portion, said socket portion being adapted to receive the other of said end members, said end portion being urgeable inwardly upon movement of said other of said end members into said socket portion to thereby effect disengagement between said mid portion and said neck portion to permit said jaws to be moved inwardly, and retaining means disposed about the exterior of said jaws and movable thereagainst to urge said jaws toward each other.

3. A connector for securing together a plurality of elements, said connector comprising a movable sleeve, a plurality of spaced apart receptacle sections located within said sleeve and having socket portions, said receptacle sections being movable outwardly to an open position and movable inwardly to a closed position, a protuberant member shaped for entry within said socket portions when said receptacle sections are in said open position, said protuberant member being held within said socket portions when said receptacle sections are in said closed position to thereby secure together at least a pair of said elements, said movable sleeve being normally disposed about said socket portions to restrain said receptacle sections against movement to said open position, first bias means located within said sleeve and about said receptacle sections and operative against said sleeve to tend to maintain said sleeve in position about said socket portions, a movable central element carried within said receptacle sections, and second bias means located within said receptacle sections and operative against said central element and tending to move said central element within said socket portions to maintain said socket portions in said open position, the entry of said protuberant member within said socket portions effecting movement of said central element and permitting said sleeve to be biased to maintain said socket portions in said closed position.

4. A connector for securing together a plurality of elements, said connector comprising a helical coil spring forming a movable sleeve, a plurality of spaced apart receptacle sections located within said sleeve and having socket portions, said receptacle sections being movable outwardly to an open position and movable inwardly to a closed position, a protuberant member shaped for entry within said socket portions when said receptacle sections are in said open position, said protuberant member being held within said socket portions when said receptacle sections are in said closed position to thereby secure together at least a pair of said elements, said movable sleeve being normally disposed about said socket portions to restrain said receptacle sections against movement to said open position, a movable central element carried within said receptacle sections, and bias means located within said receptacle sections and operative against said central element and tending to move said central element within said socket portions to maintain said socket portions in said open position, the entry of said protuberant member within said socket portions effecting movement of said central element and permitting said spring sleeve to bias said socket portions into said closed position.

5. A connector for securing together a plurality of elements, said connector comprising a pair of end means connected, respectively, with said elements, one of said end means including complementing sections spaced from one another, said sections forming a chamber, at least one of said sections having a shoulder and cooperating with the other section to provide a socket, plunger means in said chamber normally biased for entry into said socket for moving said sections forming said socket apart from each other, said other end means having a portion extendable into said socket and having a shoulder thereon in interlockable relationship with the shoulder of said socket, said section having the shoulder being movable laterally providing for disengagement of said shoulders; movable retaining means normally disposed laterally of said laterally movable section, said retaining means being movable to a non-retaining position with respect to said movable section; and spring means normally yieldingly urging said retaining means at its movable section retaining position.

6. A connector as defined in claim 5, in which each of said complementing sections is provided with a shoulder and the shoulder of said other end means being in interlockable relationship with both of said shoulders, both of said complementing sections being movable laterally and said retaining means is disposed normally laterally of both of said sections and is movable to non-retaining position with respect to both of said movable sections.

7. A connector as defined in claim 5, in which the retaining means is a sleeve surrounding said complementing sections and the spring means is interposed between the sections and the interior surface of the sleeve.

8. A connector as defined in claim 7, in which the complementing sections are elongated, one end thereof providing said socket and the other end thereof providing a guide for said sleeve.

9. A connector as defined in claim 7, in which at least one of said complementing sections is provided with a camming surface on the exterior thereof, and a complementing camming surface on the interior of said sleeve, said spring means normally urging said camming surfaces into camming relationship.

10. A connector as defined in claim 5, in which at least one of said complementing sections is provided with a camming surface on the exterior thereof, and a complementing camming surface on the interior of said movable retaining means, said spring means normally urging said camming surfaces into camming relationship.

11. A connector as defined in claim 5, in which the plunger means in said chamber includes a camming member engageable with said section having said shoulder and includes a spring normally yieldingly urging said camming member toward lateral camming engagement of said section having said shoulder.

12. A connector as defined in claim 5 wherein said plunger means comprises an elongated electrically non-conductive member.

13. A connector as defined in claim 5 wherein said plunger means comprises an electrically non-conductive member and a spring, said spring biasing said non-conductive member toward said other end means.

14. A connector as defined in claim 13 including means for electrically isolating at least one end of said spring from said complementary sections.

15. A connector as defined by claim 5 wherein said sleeve retaining means comprises an electrically non-conductive sleeve.

16. A connector as defined in claim 6, in which said plunger means in said chamber includes a coil spring having a camming surface engageable with said sections for moving the same laterally, said coil spring having an end portion adapted to be engaged by said portion on said other end means when said shoulders are in latching position with one another, said coil spring including a portion normally urging said camming surface thereof toward camming position.

References Cited by the Examiner

UNITED STATES PATENTS

| | | | |
|---|---|---|---|
| 423,386 | 3/90 | Miller | 279—37 |
| 2,321,533 | 6/43 | Wagoner | 279—37 |
| 2,614,781 | 10/52 | Engel | 279—37 |
| 2,629,156 | 2/53 | Kamens et al. | 24—211 |
| 2,654,135 | 10/53 | Grizzard et al. | 24—201 |
| 2,902,737 | 9/59 | Moran | 24—230 |

FOREIGN PATENTS

| | | |
|---|---|---|
| 537,236 | 2/22 | France. |
| 786,785 | 2/53 | France. |

DONLEY J. STOCKING, *Primary Examiner.*

ABRAHAM G. STONE, *Examiner.*